US008002877B1

(12) United States Patent
Sadler

(10) Patent No.: US 8,002,877 B1
(45) Date of Patent: Aug. 23, 2011

(54) METHOD OF TRAPPING ETHYLENE

(76) Inventor: Lawrence Sadler, Palmetto, FL (US)

( * ) Notice: Subject to any disclaimer, the term of this patent is extended or adjusted under 35 U.S.C. 154(b) by 1105 days.

(21) Appl. No.: 11/635,150

(22) Filed: Dec. 7, 2006

(51) Int. Cl.
B01D 53/02 (2006.01)
(52) U.S. Cl. .................................. 95/144; 95/90; 95/145
(58) Field of Classification Search .................... 95/144, 95/145
See application file for complete search history.

(56) References Cited

U.S. PATENT DOCUMENTS

| 1,909,811 | A | * | 5/1933 | Connolly | 558/40 |
| 3,458,973 | A | * | 8/1969 | Greathouse et al. | 95/144 |
| 3,958,028 | A | * | 5/1976 | Burg | 426/418 |
| 4,061,483 | A | * | 12/1977 | Burg | 62/268 |
| 6,071,472 | A | * | 6/2000 | Caupin et al. | 422/4 |
| 6,517,611 | B1 | * | 2/2003 | Kuznicki et al. | 95/144 |
| 6,524,750 | B1 | * | 2/2003 | Mansuetto | 429/232 |
| 6,641,788 | B1 | * | 11/2003 | Ogawa et al. | 423/213.2 |
| 6,890,373 | B2 | * | 5/2005 | Nemoto et al. | 95/90 |
| 2003/0153457 | A1 | * | 8/2003 | Nemoto et al. | 502/402 |
| 2009/0104086 | A1 | * | 4/2009 | Zax et al. | 422/121 |

* cited by examiner

Primary Examiner — Robert J Hill, Jr.
Assistant Examiner — Christopher P Jones
(74) Attorney, Agent, or Firm — Kunzler Needham Massey & Thorpe

(57) ABSTRACT

Ethylene is a gaseous growth hormone produced by plant which triggers the ripening of fruits and vegetables. Titanium dioxide, positioned on a filter, acts to trap ethylene to remove the ethylene from a vegetation storage container. Sodium silicate is utilized to absorb moisture to reduce the absorption of moisture by the titanium dioxide to prolong the ethylene trapping capacity of the titanium dioxide. The filter, after becoming saturated to a desired extent with ethylene, is removed from the vegetation storage container and heated to facilitate a release of the ethylene from the titanium dioxide. This process provides for a reconditioning of the filter for continued use within the vegetation storage container. Producing an air flow and providing for exhaust of ethylene enhance the reconditioning of the filter during the application of heat.

13 Claims, 4 Drawing Sheets

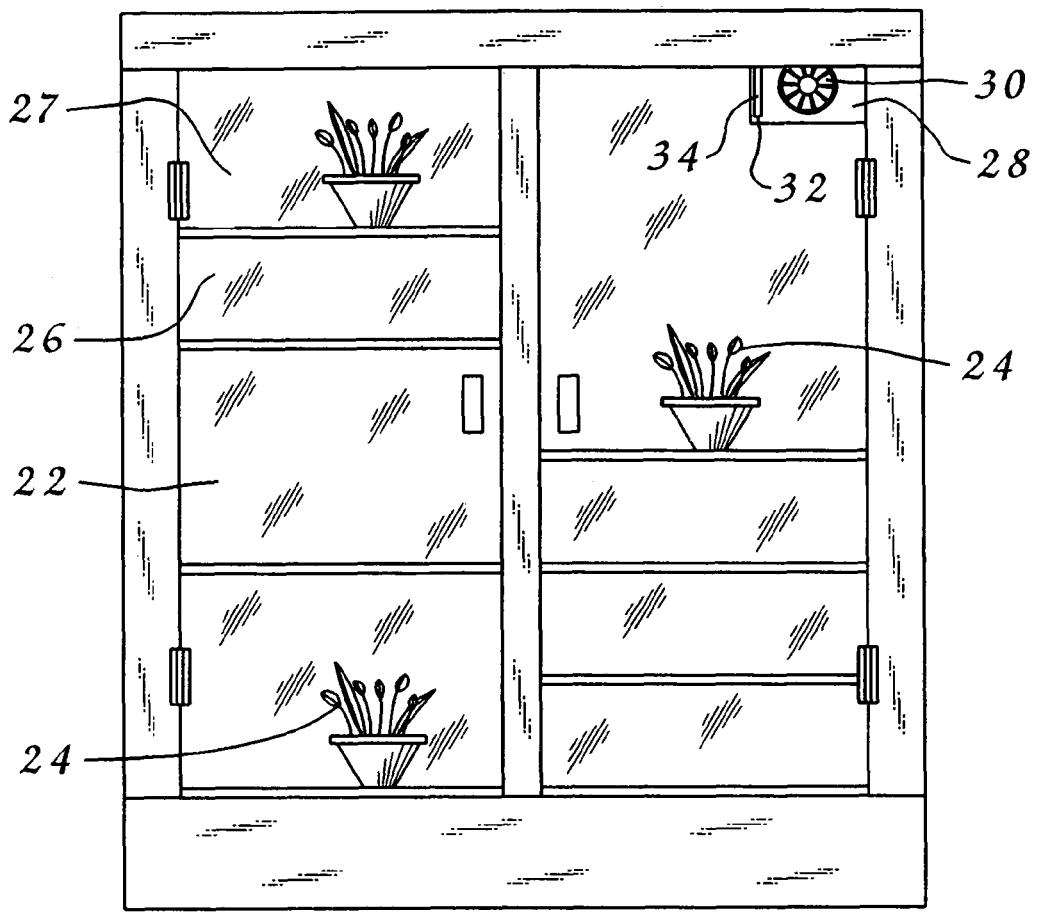
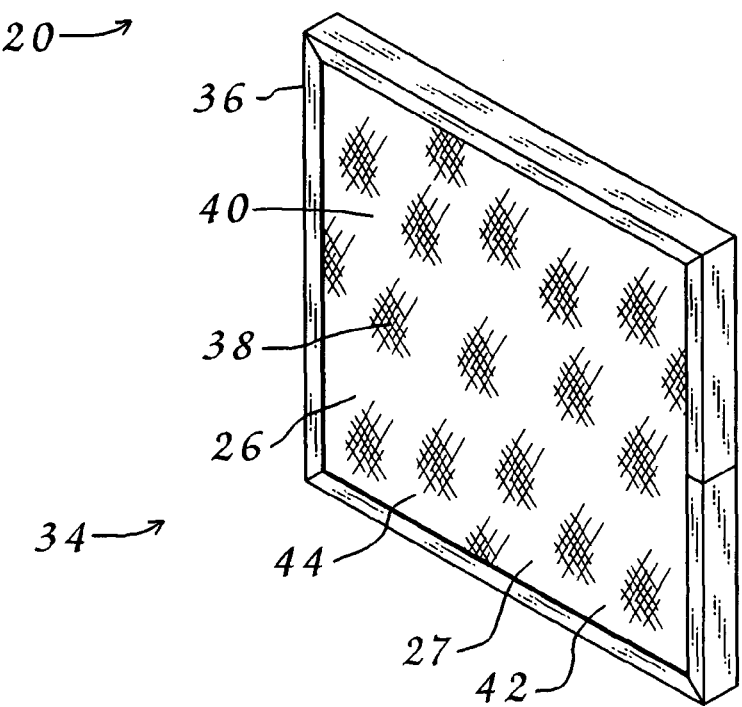
FIG. 1
FIG. 2

METHOD OF TRAPPING ETHYLENE

BACKGROUND

1. Field of the Invention

Generally, the invention relates to removing ethylene, a naturally occurring gaseous growth hormone produced by plant tissue, from a closed storage unit to reduce a ripening of plant material stored in the closed storage unit. More specifically, the invention relates to such removal of ethylene where a mere trapping of the ethylene occurs without structurally alteration to breakdown the ethylene.

2. Description of the Prior Art

Numerous methods exist to filter the air of a closed environment. Such filters typically merely clean the air supply of particulate material of some respective size. This is not applicable to the efficient removal of ethylene due to the very small size of such ethylene which routinely passes through conventional filters.

It has been proposed to utilize a series of tubes, each having a coating of titanium dioxide, and an activating method, in the form of ultraviolet light, to produce a catalytic reaction to breakdown ethylene into carbon dioxide and water. This has proven to reduce a concentration of ethylene in storage units, and therefore reduce the ripening of plant material stored in the storage units. A major drawback to this approach is the high cost of installation and the high cost of operation associated with such systems.

It is generally accepted in the industries of fresh fruit, fresh vegetables and cut flowers that a 'spoilage rate' will exist prior to eventual commercial use. The 'spoilage rate' can be in a range of thirty (30) to forty (40) percent. Using the cut flower industry as an example, an average 'shelf life' of ten (10) to fourteen (14) days, in refrigerated storage, exists prior to the commencement of deterioration beyond industry standards for retail sale. It being understood that in each industry an acceptable standard must exist for a period of time after the retail sale. Typically this is considered to be at least five (5) days after the retail sale in the cut flower industry. It is a standard in the cut flower industry that deterioration of cut flowers are judged by the more delicate outer leaves which are first to deteriorate. Due to the 'spoilage rate' in each of the above mentioned industries there exists a very strong need to increase the 'shelf life' period which the various plant materials may be retained prior to being utilized in the retail arena.

Various deficiencies exist with existing air filters, which do not trap ethylene, and with the existing catalytic reaction to breakdown ethylene.

As can be seen various attempts have been made to reduce ethylene in storage units to prolong a storage period for plant material. These attempts have been less efficient than desired. As such, it may be appreciated that there continues to be a need for a simple and inexpensive method of removing ethylene from a storage environment for plant material. The present invention substantially fulfills these needs.

SUMMARY

In view of the foregoing disadvantages inherent in the known types of ethylene removal devices, your applicant has devised a method of trapping ethylene from a gaseous environment of a vegetation storage container. The method provides for removal of a portion of the ethylene from the gaseous environment of the vegetation storage container. This removal of ethylene provides for retarding the maturing of vegetation contained within the vegetation storage container and exposed to the gaseous environment to prolong the useful period of time that the vegetation may be stored prior to utilization of the vegetation for a useful purpose. The method comprises the steps of providing an air circulation system for the vegetation storage container, providing a filter and positioning a composition on the provided filter. The provided air circulation system circulates air within the vegetation storage container. The air circulation system has a path which at least a portion of the gaseous environment of the vegetation storage container will pass while the air circulation system is functioning. The provided filter is positioned within the path of the air circulation system where at least the portion of the gaseous environment of the vegetation storage container will contact the filter while the air circulation system is functioning. The composition positioned on the filter contains at least titanium dioxide. This positioning of the filter provides for at least the portion of the gaseous environment of the vegetation storage container to encounter the composition containing titanium dioxide positioned on the filter while the air circulation system is functioning. At least a portion of the ethylene then becomes attached to the titanium dioxide on the filter and is retained thereat and is thereby removed from the gaseous environment within the vegetation storage container.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for trapping ethylene in a composition containing at least titanium dioxide positioned on a filter to remove the ethylene from a vegetation storage container to reduce a ripening of plant material stored in the vegetation storage container.

Other objects include;

a) to provide for the trapping of ethylene to occur without performing any breakdown of the ethylene.

b) to provide for removal of the filter, having titanium dioxide positioned thereon, from the storage container with a reconditioning of the filter occurring outside of the storage container to release the trapped ethylene.

c) to provide for filters, having titanium dioxide positioned thereon, which may be employed for many cycles of ethylene trapping and filter reconditioning.

d) to provide for filters, having titanium dioxide positioned thereon, which will not deliberately collect normal particulate material from the air flow during the filtering of the ethylene where the filter will not become unduly clogged with non ethylene particulate material.

e) to provide for use of heat to facilitate the release of the ethylene from the filter during the reconditioning of the filter.

f) to provide for use of an air flow applied to the filter during the administration of heat to the filter during the reconditioning of the filter.

g) to provide for an exhausting of the ethylene from a filter reconditioning unit utilized during the reconditioning of the filter.

h) to provide for use of sodium silicate to absorb moisture prior to the moisture being absorbed by the titanium dioxide.

i) to provide for a mixture of titanium dioxide and sodium silicate to be applied to the filter where the sodium silicate will absorb moisture and the titanium dioxide with trap ethylene.

j) to provide for an extremely economical method of removing ethylene from a free atmosphere within a storage environment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is a front elevational view of a vegetation storage container having an air circulation system.

FIG. 2 is a perspective view of a filter having features of the present invention and installable in the air circulation system of the vegetation storage container shown in FIG. 1.

DESCRIPTION

Figure 3A:
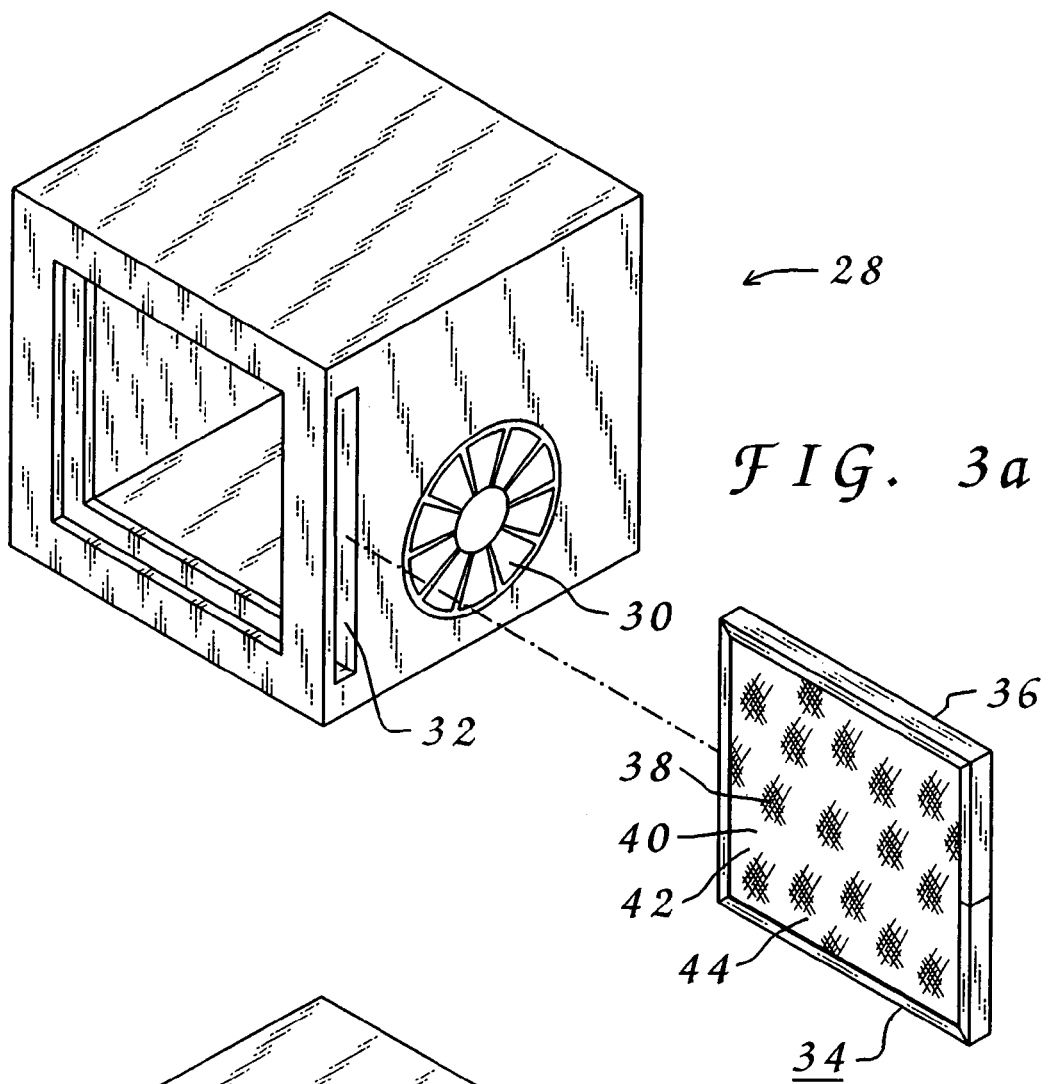
FIG. 3a and FIG. 3b are perspective views of the air circulation system of the vegetation storage container shown in FIG. 1 in alternative orientations with the filter shown in FIG. 2 removed and installed therein.

Many different methods having features of the present invention are possible. The following description describes the preferred embodiment of select features of those methods and various combinations thereof. These features may be deployed in various combinations to arrive at various desired working configurations of methods.

Reference is hereafter made to the drawings where like reference numerals refer to like parts throughout the various views.

Vegetation Storage Container

Vegetation storage containers are utilized to store flowers, vegetables and fruits. Such vegetation may be growing at the time of such storage, such as live flowers, or may have been harvested prior to such storage, such as cut flowers. Such storage can be during transport of the materials or in fixed locations. Examples of transport storage include sea/land cargo containers, airplane container transportation, truck container transportation and train container transportation. Cut flowers are an excellent example of such materials which are stored in transit and stored in fixed locations, for periods of time prior to eventual use. Any applicable plant material, in their respective commercial application, has a spoilage rate where some of the plant material ripens beyond their acceptable commercial use life and therefore must be discarded. Such spoilage causes a great deal of monetary loss in their respective industries. A strong desire exists to prolong the useful storage period of plant materials to permit eventual use of the plant material while that plant material is in an acceptable physical state and therefore to reduce monetary loss to increase profit and/or reduce cost to the consumer.

Ethylene, in the current context, is a naturally occurring gaseous growth hormone produced by plant tissue which triggers the ripening process. Ethylene is also produced from other sources, such as cigarette smoke, select fungi and internal combustion engines. The term vegetation and the term plant material as used herein each refer to any material which is routinely stored and which produce ethylene and/or which is acted upon by ethylene.

It is known in the art to utilize titanium dioxide in an activated state, typically activated by some form of ultraviolet light, to interact with ethylene to break down the ethylene into carbon dioxide and water. Such use of titanium dioxide to remove ethylene from an environment is radically different from the use of the present invention.

FIG. 1 depicts a vegetation storage container 20 having a gaseous environment 22 contained therein. Various vegetation 24 are contained in vegetation storage container 20 for storage prior to being utilized for their intended purpose. Vegetation 24 produce and release ethylene 26 into gaseous environment 22. Ethylene 26 causes a ripening of vegetation 24. Gaseous environment 22 also contains moisture 27.

Air Circulation System

Typically vegetation storage containers have an air circulation system and often means to condition the air, in the form of temperature control and/or moisture control. The air circulation system will have a path which at least a portion of the gaseous environment of the vegetation storage container will pass while the air circulation system is functioning. Often some basic form of air filtering is included within the air circulation system of such vegetation storage containers. When a vegetation storage container has an existing air circulation system it will be utilized to bring at least a portion of the gaseous environment of the vegetation storage container into contact the filter while the existing air circulation system is functioning. When the vegetation storage container does not have an existing air circulation system a dedicated air circulation system will be provide.

FIG. 1 depicts vegetation storage container 20 having an air circulation system 28. Air circulation system 28, also shown in FIG. 3a and FIG. 3b, has a fan 30 which circulates gaseous environment 22 in an airflow path within vegetation storage container 20. Air circulation system 28 further has a filter receiving slot 32, see FIG. 3a.

Filter

It is known in the art to form air filters from many different materials. The term filter as used herein refers to an object which will be placed within a path of a created air flow where at least a portion of the air flow may come into contact with a portion of the filter. The created air flow may pass through a permeable material of the filter or may merely move over a surface, or surfaces, of the filter. In the most preferred embodiment of the present invention the created air flow will pass through the filter.

It is conventionally known to apply titanium dioxide to a surface of a filter and utilize an energy source, such as ultraviolet light, to activate the titanium dioxide to breakdown ethylene which comes into contact with the activated titanium dioxide. Ethylene under this treatment is broken down to compositions which do not trigger the ripening process in vegetation. This prior art method is not applicable to the present invention because it does not trap the ethylene relative to the titanium dioxide.

The filter can take many forms with a preferred embodiment providing for the filter to be removed from the vegetation storage container for reconditioning where the trapped ethylene is released outside of the vegetation storage container. This is easily provided for by having the filter to have a frame portion and a composition receiving material positioned within the frame portion. The placement of the composition receiving material relative to the frame is generally equivalent to placement of particulate filtering material placement within conventional air cleaning filters known in the art. Ideally the frame portion will be constructed of a material, such as plastic, which will not absorb moisture. This provides for a durable filter which will be capable of being utilized for many ethylene trapping cycles and many reconditioning cycles, where the trapped ethylene is released from the filter.

The filter may utilize many different materials as the composition receiving material to receive the titanium dioxide. An excellent choice is a permeable paper material to receive a coating of titanium dioxide while retaining a capacity for air to flow through the paper material. In testing, a filter having a paper based substrate as the composition receiving material readily accepted application of a composition containing titanium dioxide and provided excellent retention properties for the composition during subsequent handling of the filter. Another good choice for the composition receiving material is a very large quantity of fiberglass strands, preferably residing in overlying patterns. While the filter may be disposable after a single use, it is preferred that each filter be of a design permitting repeated cycles of ethylene trapping and ethylene releasing. Both paper material based and fiberglass strand material based filters are excellent choices for such repeated use. Without regard for the selection of composition receiving material, it is possible to provide for the filter to have a plurality of layers with each layer having titanium dioxide positioned thereon.

It is a strong desire to prevent the filter of the present invention from becoming clogged with particulate material filtered from the environment of the vegetation storage container. This is easily accomplished by having the composition receiving material of the filter to have a passage spacing which permits normal airborne particulate material to pass therethrough without being trapped by the composition receiving material. This desire may also be accomplished by having a conventional particulate filter placed in the path of the air flow upstream of the filter of the present invention where the conventional particulate filter traps the normal airborne particulate material before it may reach the filter of the present invention.

FIG. 2, FIG. 3a, FIG. 3b and FIG. 4 each depict a filter 34 having a frame 36 and composition receiving material 38 positioned within frame 36. Frame 36 is formed of a plastic while composition receiving material 38 is formed of a paper based material disposed in a plurality of layers.

Figure 3B:
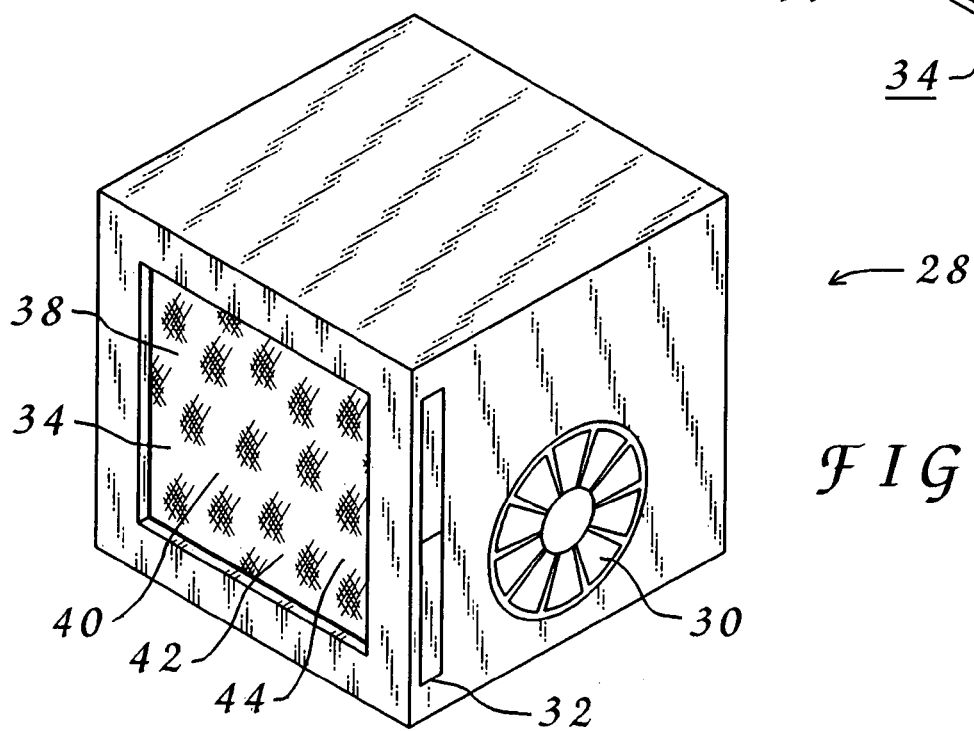

FIG. 1 and FIG. 3b depict filter 34 positioned in filter receiving slot 32 in an air flow path created by fan 30 of air circulation system 28 within vegetation storage container 20, see FIG. 1. Filter 34 is removeable from air circulation system 28 of vegetation storage container 20 for replacement and/or reconditioning.

While air circulation system 28 is depicted having filter receiving slot 32 for placement and retention of filter 34, any conventionally known placement and retention method may be utilized with the present invention.

Titanium Dioxide

Titanium dioxide, sometimes known as titanium oxide or titania, is commonly used as a pigment. Titanium dioxide occurs in various forms in nature. It is the unique molecular structure of titanium dioxide which permits it to trap and retain ethylene. The molecular structure of titanium dioxide and the molecular structure of ethylene cooperate to trap and retain the ethylene during movement thereby to permit the ethylene to be removed from the gaseous environment within the vegetation storage container.

Various methods are known in the art to position a composition on a material and many of these may be utilized with the present invention. The composition of the present invention will contain at least titanium dioxide. One method of positioning the titanium dioxide on the filter involves creating a slurry with purified water and the titanium dioxide, applying the slurry to the filter then baking the filter to dry and attach the slurry to the filter. Sodium silicate may be included in the composition. Other materials may be incorporated into the composition as desired, such as those which act as a bonding agent between the composition and the composition receiving material.

FIG. 2 depicts filter 34 having a coating of a composition 40 positioned thereon. Composition 40 has incorporated therein titanium dioxide 42 wherein titanium dioxide 42 is positioned on filter 34. When air containing ethylene 26 is moved through filter 34 titanium dioxide 42 traps at least some of the ethylene 26 from gaseous environment 22.

Sodium Silicate

Sodium silicate, in silica gel form, readily absorbs water. It is known in the art to use sodium silicate to absorb moisture. This reduction of moisture in the air acts to reduce other compositions or materials from absorbing moisture. It is known in the art to combine sodium silicate with other substances to form compositions. Many methods may be utilized to perform this combination of substances and many of these may be utilized to combine sodium silicate and titanium dioxide.

When sodium silicate is provided for the present invention, it may be positioned separate from the titanium dioxide, positioned in extremely close proximity to the titanium dioxide, or combined to form a composition of sodium silicate and titanium dioxide. When a composition is formed of titanium dioxide and sodium silicate other substances may be incorporated into the composition for various useful purposes. When a composition of sodium silicate and titanium dioxide is created various proportions may be employed with a preference of generally equal portions of sodium silicate and titanium dioxide. While the separate substances may be applied individually to the filter, preferably the substances are mixed together prior to being positioned on the filter.

FIG. 2 depicts filter 34 having the coating of composition 40 positioned thereon. Composition 40 also has incorporated therein sodium silicate 44 wherein sodium silicate 44 is positioned on filter 34. When air is moved through filter 34 sodium silicate 44 traps moisture 27 from the air to reduce the absorption of moisture 27 by titanium dioxide 42 positioned on filter 34.

Filter Reconditioning Unit

In the most preferred embodiment of the present invention filters which have absorbed a desired quantity of ethylene will be removed from the vegetation storage container and reconditioned to release and remove the trapped ethylene from the filter. This reconditioning may take various forms with a preferred method being heating of the filter. This heating is not intended to facilitate a catalytic reaction but rather to facilitate release of the ethylene from the titanium dioxide. Many methods are known in the art to produce heat and many of these may be utilized with the present invention. Preferably air flow production means are included to circulate air to move the released ethylene away from the filter during the introduction of the releasing heat. The filter reconditioning unit preferably has exhaust means to discharge the released ethylene from the filter reconditioning unit during a reconditioning operation.

The filter reconditioning unit will have the capacity to receive at least one filter having features of the present invention. Preferably, the filter reconditioning unit will have the capacity to receive for treatment a plurality of filters, in a plurality of filter placement positions, for common treatment during a single reconditioning operation.

Figure 4:
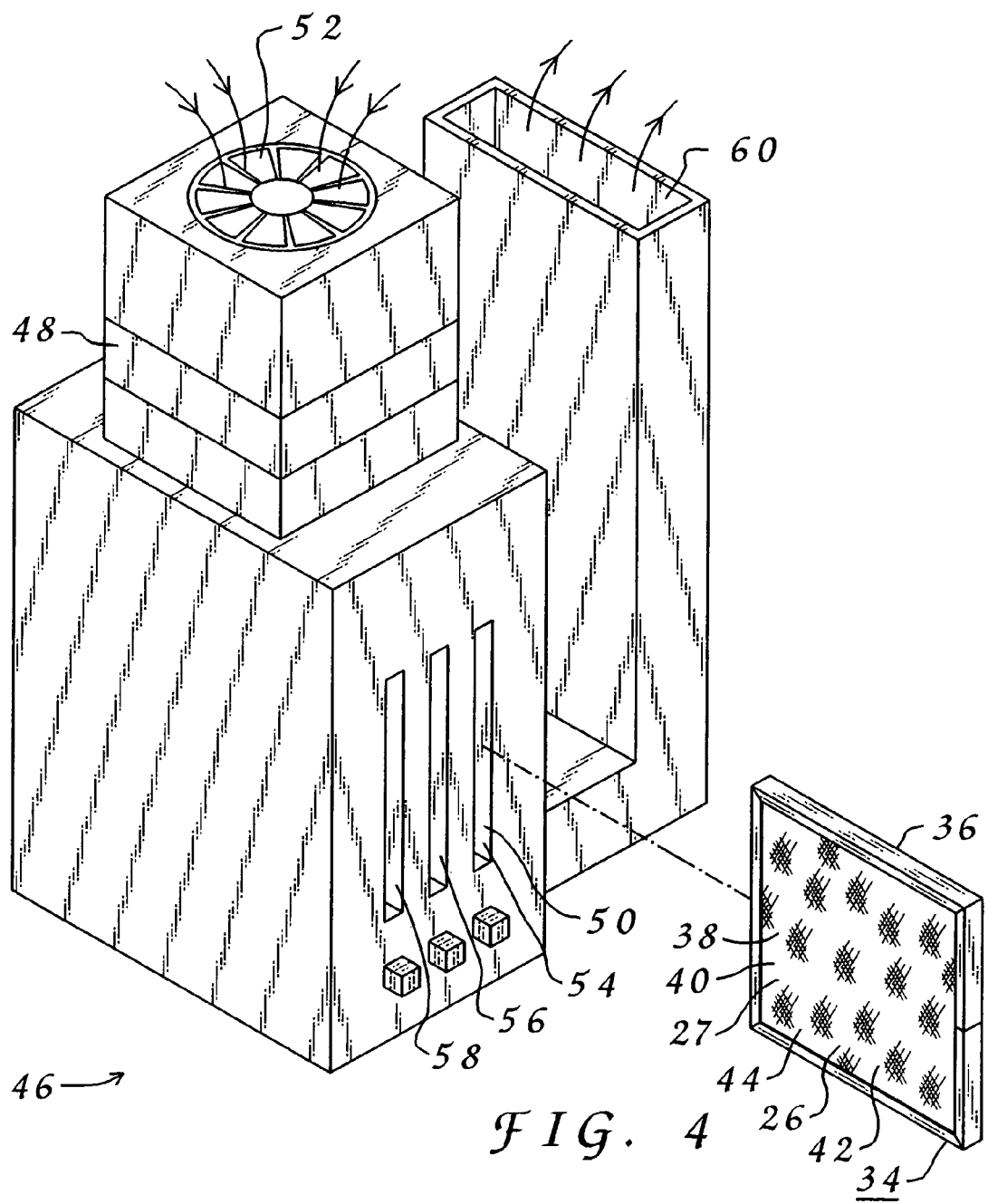
FIG. 4 is a perspective view of a filter reconditioning unit with the filter shown in FIG. 2 positioned for insertion therein.

FIG. 4 depicts a filter reconditioning unit 46 having heat production means in the form of a heater 48. Filter reconditioning unit 46 has a series of filter receiving slots 50 for placement of filters 34. Filter reconditioning unit 46 permits controlled introduction of heat from heater 48 to filter(s) 34 positioned in filter receiving slots 50 during a reconditioning operation of filter 34 to release ethylene 26 from titanium dioxide 42 positioned on composition receiving material 38 of filter 34. It being understood that the heat applied to filter 34 during the reconditioning operation is not intended to activate titanium dioxide 42 to convert ethylene 26 but merely to cause a release of ethylene 26 from titanium dioxide 42. The heat produced by heater 48 of filter reconditioning unit 46 also causes a release of moisture 27 trapped by sodium silicate 44 positioned on composition receiving material 38 of filter 34. Air flow production means, in the form of a fan 52, circulate air to filter(s) 34 installed in filter reconditioning unit 46 to further facilitate release of ethylene 26 retained by titanium dioxide 42. If desired fan may direct the circulated air through filter(s) 34 installed in filter reconditioning unit 46 in the reverse direction from the direction of passage of air during the trapping of ethylene 26 in vegetation storage container 20. Filter reconditioning unit 46 has a plurality of filter placement positions 54, 56 and 58 to house a plurality of filters 34 during the reconditioning procedure. Fan 52 moves air over or through each filter 34 positioned in filter reconditioning unit 46. Exhaust means, in the form of an exhaust duct 60, provides for a discharge of ethylene 26, released from titanium dioxide 42 of composition 40 positioned on composition receiving material 38 of filter 34, from filter reconditioning unit 46 during the reconditioning operation. Exhaust duct 60 also provides for a discharge of moisture 27, released from sodium silicate 44 of composition 40 positioned on composition receiving material 38 of filter 34, from filter reconditioning unit 46 during the reconditioning operation.

Method

In the most preferred embodiment of the present invention a method is provided for trapping ethylene from a gaseous environment within a vegetation storage container, extending the ethylene filtering property of a filter having titanium dioxide positioned thereon and releasing the trapped ethylene outside of the vegetation storage container. The method provides for removal of a portion of the ethylene from the gaseous environment of the vegetation storage container to provide for retarding the maturing of vegetation contained within the vegetation storage container and exposed to the gaseous environment containing the ethylene. This removal of a portion of the ethylene prolongs the useful period of time that the vegetation may be stored prior to utilization of the vegetation for a useful purpose.

Figure 5:
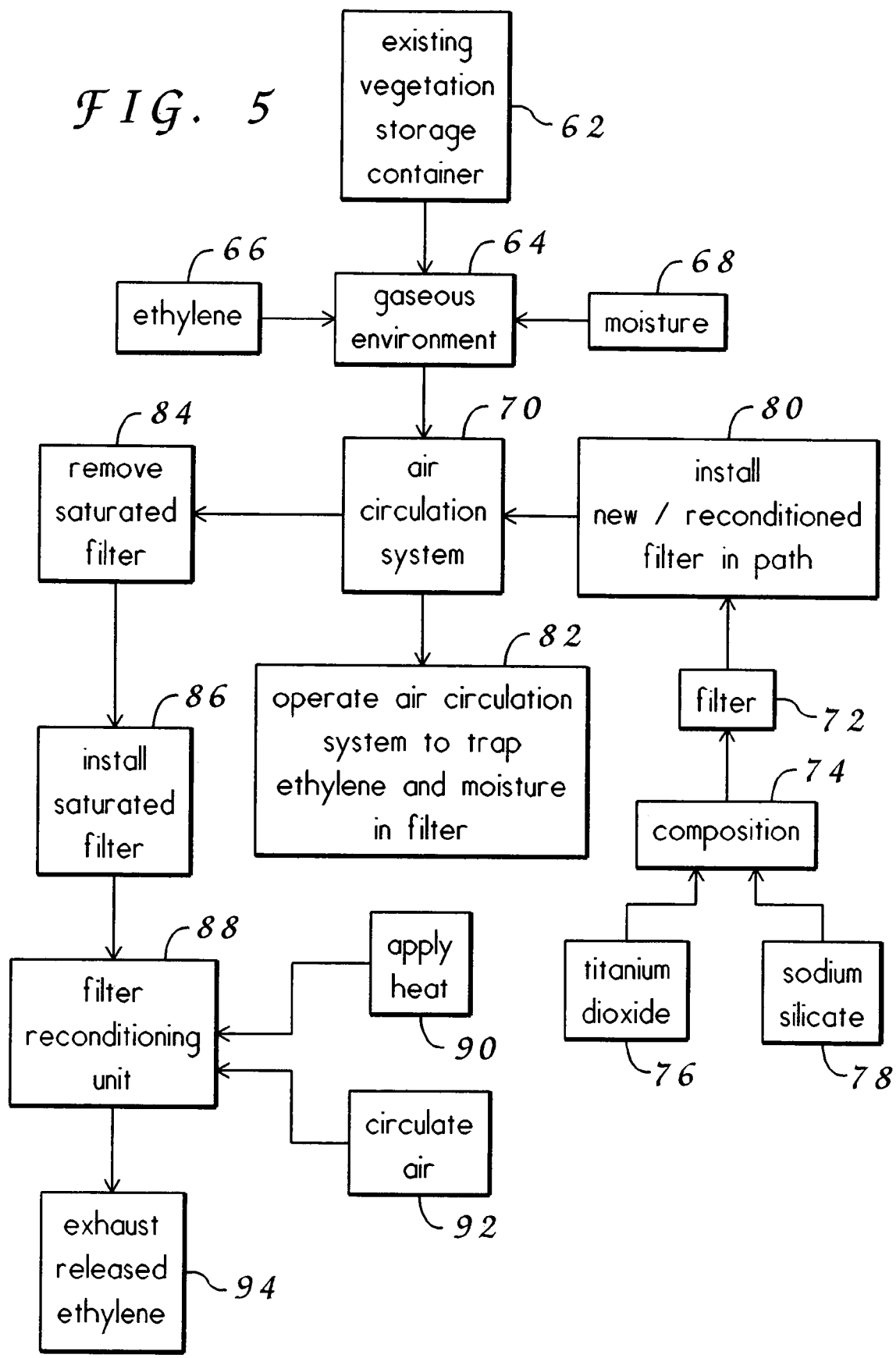
FIG. 5 is a flow chart showing various features of the present invention.

FIG. 5 depicts various steps of a preferred embodiment of a method of the present invention. 'Existing vegetation storage container' 62 has 'gaseous environment' 64 having 'ethylene' 66 and 'moisture' 68 therein. 'Air circulation system' 70 moves 'gaseous environment' 64 within 'existing vegetation storage container' 62. 'Filter' 72 has 'composition' 74 having 'titanium dioxide' 76 and 'sodium silicate' 78 positioned thereon. 'Install new/reconditioned filter in path' 80 of 'air circulation system' 70 of 'existing vegetation storage container' 62 occurs. 'Operate air circulation system to trap ethylene and moisture in filter' 82 occurs to remove 'ethylene' 66 and 'moisture' 68 from 'gaseous environment' 64 of 'existing vegetation storage container' 62.

The reconditioning operation involves 'remove saturated filter' 84 from 'air circulation system' 70. 'Install saturated filter' 86 in 'filter reconditioning unit' 88 then occurs during the reconditioning operation. 'Apply heat' 90 in 'filter reconditioning unit' 88 and 'circulate air' 92 in 'filter reconditioning unit' 88 then occurs. This releases 'ethylene' 66 from 'filter' 72 within 'filter reconditioning unit' 88 while 'exhaust released ethylene' 94 occurs to remove 'ethylene' 66 from 'filter reconditioning unit' 88 where the reconditioning of 'filter' 72 is performed.

Testing

Applicant built an ethylene trapping system, based upon the present invention, and incorporated that system into a refrigerated storage container for cut flowers. The below described test was conducted twice to confirm and validate and consistency of the results. Cut flowers of various types were commercially obtained in sufficient quantities for the test and split into two (2) generally equal test groups. There was no selection criteria other than obtaining generally equal breakage of each represented species of flower into the two (2) groups. A first randomly selected test group was then placed in a commercial cut flower storage unit being comparable with industry standard for mid sized floral shops. The second test group was then placed in the refrigerated storage container having the ethylene trapping system based upon the present invention. Temperature and moisture content for the opposing test storage containers was standardized and maintained during the entire respective test periods. The cut flowers of each group were observed in a standardized manner on a fixed schedule.

The cut flowers in the first test group, and stored in the industry standard commercial cut flower storage unit, began to show deterioration of the outer leaves in fourteen (14) days. This placed them at the end of their respective industry established 'shelf life'. This 'shelf life' period for the first test group generally matched the standard established in the cut flower industry. A randomly selected grouping of these cut flowers were then removed and displayed at room temperature as would typically exist subsequent to a retail sale. They were then monitored on a daily basis to determine an acceptable 'display period' as accepted in the cut flower industry. Five (5) days was the 'display period' for this test group, which generally matched the standard established in the cut flower industry.

The cut flowers in the second test group, and stored in the refrigerated storage container with the ethylene trapping system based upon the present invention incorporated therein, had randomly selected cut flowers removed at thirty (30) days, sixty (60) days and ninety (90) days. At each of the respective removal dates an examination revealed that no noticeable deterioration of the outer leaves had occurred. This indicated, at thirty (30) days, sixty (60) days and ninety (90) days, that the 'shelf life' standard established in the cut flower industry had not been reached for the second test group.

Following each of the three (3) removals a randomly selected respective grouping of these cut flowers were then displayed at room temperature as would typically exist subsequent to a retail sale. At each of the three (3) removals, the cut flowers were then monitored on a daily basis to determine an acceptable 'display period' as accepted in the cut flower industry. Five (5) days was the 'display period' for each of the three (3) removals for this test group, which generally matched the standard established in the cut flower industry.

As previously mentioned the above described split test was conducted twice with identical results for each of the two (2) test sets. This proved that a significant extension of the 'shelf life' storage period occurred when the ethylene trapping system based upon the present invention was utilized.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of trapping ethylene from a gaseous environment, the method comprising: a) providing an air circulation system for a container, the air circulation system having a path through which at least a portion of a gaseous environment inside of the container will pass while the air circulation system is functioning, the gaseous environment comprising a mixture of gases including ethylene; b) providing a filter positionable within the path of the air circulation system wherein at least the portion of the gaseous environment of the container will contact the filter while the air circulation system is functioning; and c) forming an exterior coating on the filter, the exterior coating comprising titanium dioxide, wherein at least the portion of the gaseous environment of the container will encounter the exterior coating while the air circulation system is functioning such that a portion of the ethylene attaches to the titanium dioxide.

2. The method defined in claim 1 wherein the provided filter further comprises a frame portion and a paper based material positioned within the frame portion and wherein the paper based material is coated with the exterior coating.

3. The method defined in claim 1 wherein the filter further comprises a frame portion formed of a plastic material.

4. The method defined in claim 1 further comprising providing sodium silicate to adsorb moisture from the gaseous environment of the container to prevent the moisture from being adsorbed by the titanium dioxide.

5. The method defined in claim 4 further comprising forming the exterior coating from a mixture of sodium silicate and titanium dioxide.

6. The method defined in claim 5 wherein the exterior coating is formed of substantially equivalent portions of titanium dioxide and sodium silicate.

7. The method defined in claim 1 further comprising providing a filter reconditioning unit capable of receiving the filter and having a heating device for reconditioning the filter by releasing the ethylene adsorbed on a surface of the titanium dioxide.

8. A method of trapping ethylene from a gaseous environment, the method comprising: a) providing an air circulation system for a container, the air circulation system having a path through which at least a portion of a gaseous environment inside of the container will pass while the air circulation system is functioning, the gaseous environment comprising a mixture of gases including ethylene; b) providing a filter positionable within the path of the air circulation system wherein at least the portion of the gaseous environment of the container will contact the filter while the air circulation system is functioning; and c) forming an exterior coating on the filter, the exterior coating comprising titanium dioxide, wherein at least the portion of the gaseous environment of the container will encounter the exterior coating while the air circulation system is functioning such that a portion of the ethylene attaches to the titanium dioxide; and d) providing a filter reconditioning unit having a heating device for reconditioning the filter by releasing the ethylene adsorbed on a surface of the titanium dioxide.

9. The method defined in claim 8 wherein the filter reconditioning unit further comprises an air flow production device to circulate air to the filter during the reconditioning of the filter.

10. The method defined in claim 8 wherein the provided filter reconditioning unit further comprising receiving a plurality of filters for a reconditioning operation.

11. The method defined in claim 8 further comprising providing sodium silicate to adsorb moisture to remove prior to the moisture being adsorbed by the titanium dioxide.

12. The method defined in claim 11 further comprising forming the exterior coating from a mixture of sodium silicate and titanium dioxide.

13. The method defined in claim 8 wherein the filter reconditioning unit further comprises an exhaust device to discharge the released ethylene from the filter reconditioning unit.

* * * * *